Patented Dec. 5, 1939

2,181,933

UNITED STATES PATENT OFFICE 2,181,933

MANUFACTURE OF MONO-CALCIUM PHOSPHATE

Louis Block and Charles S. King, Joliet, Ill., assignors to Blockson Chemical Co., Joliet, Ill., a corporation of Illinois No Drawing. Application April 26, 1937, Serial No. 138,938

5 Claims. (Cl. 23—109)

The present invention relates to the manufacture of mono-calcium phosphate. This product is an ingredient in many commercial materials, such as baking powders, self-rising flours, other leavening agents, and specialties. Its various uses have given rise to specifications of physical form which are difficult of attainment in a single product by known processes. Thus a problem is ever present to produce at reasonable cost a satisfactory powdery form of mono-calcium phosphate.

Particular requirements are crystalline form, uniformity of particle size, free-flowing characteristics for handling in mechanical equipment and proportioning devices, non-caking qualities approximately theoretical analysis, substantial permanence of particle size, dryness, etc.

Physical qualities of commercial forms of mono-calcium phosphate are in large measure determined by the manufacturing process. For example, when the material is made by pouring concentrated phosphoric acid onto lumps of quicklime, or onto hydrated lime, there is no possible uniformity of conditions to assure a uniform product. To avoid free phosphoric acid a deficiency of it is used, and yet aging is resorted to for completion of reaction. The result of this reaction is a sticky, gummy mass containing about 10% moisture, all of which makes further processing to the finish product an arduous task.

Attempts to improve upon this process have been made by adding concentrated phosphoric acid to di-calcium phosphate, while under agitation. The product is improved physically, but to secure such, it contains an excess of the too alkaline di-calcium phosphate. The remaining moisture, about 14%, is costly to remove, and the desired particle size must be produced by mechanical means such as grinding and sizing, as in the first cited present commercial process.

Other procedures have been used, such as spray drying processes, using more aqueous mixtures of lime and phosphoric acid. More or less uniform masses may be obtained, but the particles are of variable form or density. They may be hollow, or cupped, or spherical or otherwise shaped, and as to mass depend upon the uniformity of the particles produced by the liquid spray devices.

Still another method is to crystallize mono-calcium phosphate from a solution thereof in a relatively large excess of phosphoric acid. Thus, crystalline plates of soft fluffy character are obtained which do not adequately meet all the commercial requirements. The removal from the crystals of excess phosphoric acid derived from the mother liquor is a necessary consideration.

By the present invention we provide a process which operates upon a quite different physical basis, yet which employs the chemical reaction wherein phosphoric acid acts upon dicalcium phosphate.

Some of the objects and advantages of the invention to be achieved singly or in combination are to react upon di-calcium phosphate with phosphoric acid in a liquid medium in which both the di-calcium phosphate and the resulting mono-calcium phosphate are relatively or substantially insoluble; to use a form of di-calcium phosphate which may be converted with little change of size or form into mono-calcium phosphate; to secure a dry, free-flowing permanently-sized and predetermined granulated mono-calcium phosphate of more correct chemical composition with a minimum of unchanged di-calcium phosphate and a minimum of adherent free phosphoric acid.

A particular object of the invention is to act upon a particle of dicalcium phosphate dihydrate by means of a liquid medium containing phosphoric acid which is reactive upon and penetrative in the particle to convert it without change of configuration into mono-calcium phosphate monohydrate, which liquid medium is substantially a non-solvent for each of said calcium phosphates.

Various other and ancillary objects and advantages of the invention will appear hereinafter from the discussion of the invention as explained with reference to various influential factors or variables.

The invention contemplates the use of a liquid medium in which phosphoric acid is available for reaction upon di-calcium phosphate suspended therein, and in which both the di-calcium phosphate and the resulting mono-calcium phosphate are quite insoluble. The desired product mono-calcium phosphate mono-hydrate is soluble to some extent in water, in 100% phosphoric acid, and in mixtures of water and phosphoric acid. Di-calcium phosphate in its hydrous and anhydrous forms is susbtantially insoluble in water, but in phosphoric acid (100% or aqueous) it is reactive to form the mono-calcium phosphate mono-hydrate, part of which dissolves. By the present invention the liquid medium is suitably altered to preserve the reactive power, but to minimize or remove the solvent power. By using such a liquid we have discovered that particles of one material are changed into a different material without substantial change in the configuration of the particle. Various inert agents may be used to produce the desired properties of the liquid medium, provided they are solvents for phosphoric acid under the conditions of reaction, provided the mixture of the agent with the phosphoric acid is miscible with water, and further provided that the mixture with or without the water, or as used by the reaction, does not appreciably dissolve either of the said calcium phosphate compounds. The inertness of the agent is of course limited to the materials encountered in practicing the present invention under the conditions of practice.

There are many suitable agents, for some of which there may be objections for certain uses of the product. The following have been found satisfactory: acetone, methyl alcohol, ethyl alcohol, methyl acetate, ethyl acetate, and ethylene chlorhydrine. The acetates and the chloro compounds are likely to leave a persisting odor in the product. Low boiling alcohols and acetone are preferred because of their low-boiling character, being volatile below 100° C. However, higher boiling alcohols, ketones and even non-volatile agents may be used, if they provide mixtures having the essential qualities above set forth. Nevertheless, the preferred agents are ones which are easily fugitive, because excess of the agent left on the product may be removed simply by exposure to evaporation. Where less fugitive ones are used, it may be necessary to wash out residues with liquids such as the easily fugitive agents which are preferred.

The reaction depends upon using phosphoric acid, and it is the solvent power of phosphoric acid with or without water, that the invention aims to minimize or eliminate. Since the phosphoric acid content decreases in the course of the reaction, the liquid medium initially employed must take into consideration the changes which take place. However, there is also another factor which is very important, and this relates to the form of the di-calcium phosphate employed.

There are two forms of di-calcium phosphate, one of which is anhydrous $CaHPO_4$, and the other of which has two molecules of water in the formula: $CaHPO_4.2H_2O$. The mono-calcium phosphate desired has the formula:

$$Ca(H_2PO_4)_2.H_2O$$

So where these two hydrated forms are involved, the reaction proceeds as to a particle by taking away water and by adding acid. But where the anhydrous di-calcium phosphate is used, water is taken into the particle from the liquid medium and acid is added. We have discovered that our invention may be practiced in two distinct ways, one of which is most important for the certain objects of the invention. We have found that when the hydrated di-calcium phosphate is used in selected particle size, the invention may be carried out to operate thereon with conversion to the desired product without substantial change of particle size. In other words we can grade or predetermine the granulation of the mono-calcium phosphate mono-hydrate by grading or predetermining the granulation of the di-calcium phosphate dihydrate. But when the anhydrous di-calcium phosphate is used, a different and less controllable form of mono-calcium phosphate mono-hydrate is obtained. The invention will therefore be more particularly described with reference to the preferred use thereof in producing the controlled size of particle, but it is to be understood that the invention is not to be considered as limited to or by such preferred examples. In order better to explain the nature of the invention and the effect of various factors in the practice thereof, the following specific examples are given as a foundation for discussion.

Example I 230 cc. of phosphoric acid (80% grade) is mixed with 40 cc. of water and 230 cc. of acetone. With this mixture at a temperature of 55° C. in a suitable apparatus to conserve the volatile acetone, 200 grams of selected di-calcium phosphate dihydrate is added slowly with vigorous agitation. The said selected material may be pre-graded as will appear later in Table I. The mixture is kept at 55° C. for 2 hours, with sufficient agitation to keep the particles discrete, yet without excess force to effect grinding or undue subdivision by mechanical attrition. Then the mixture is filtered, the solid residue washed with acetone to remove both water and acid, and then dried at a low temperature to remove acetone.

Example II 90 cc. of 80% phosphoric acid (the theoretical requirement) is added to 230 cc. of acetone, and heated to 55° C. To this 200 grams of di-calcium phosphate dihydrate of selected grade is added slowly with agitation. The mixture is kept at 55° C. for ½ hour. Then vacuum with a slight amount of heat is applied with agitation to evaporate or distill off the acetone. A kneading-type jacketed vacuum mixer is the preferred apparatus, and solvent recovery equipment is most desirable. The product is granular and of substantially the same grade of fineness as the raw material employed.

*Discussion.*—Results vary with a number of factors and the effect of these on the process is discussed in order that variations may be made with more intelligent selection and application of conditions when it is necessary or desirable to depart from the conditions of the examples.

*Temperature.*—The operating temperature may vary considerably with any selected diluent, or the preferred temperature may change with change of diluent. Increased temperature will accelerate the reaction, but too fast a reaction tends to break down the unit particles into smaller ones, presumably by breaking up the cluster or aggregate of crystals present in each particle of mono-calcium phosphate mono-hydrate. With each agent or liquid medium a preferred temperature may be found where the change of grade from raw material to product, is a minimum. Also a temperature may be found where the yield is highest. It may therefore be desirable to choose as an intermediate temperature to balance the advantage of yield against the advantage of grade control. For acetone, as in Examples I and II, 55° C. is the preferred temperature for such balanced advantages. This temperature is just below the boiling point for acetone, and this advantage in part favors the use of acetone as the preferred agent. For example, where the temperature is 30° C. with acetone as in Example I, the yield is 90.4%. Using the same conditions and materials, except that the temperature is 55° C., the yield is 97.7%.

*Granulation.*—The yield is also variable and dependent upon the granulation of the di-calcium phosphate dihydrate. The smaller the grains, the higher the yield. But the finer the granulation of di-calcium phosphate dihydrate, the more difficult it is to wash out any excess acid which is present, as in Example I. In general there is a very close relationship between the granulation of the mono-calcium phosphate dihydrate obtained, and the granulation of the di-calcium phosphate dihydrate used. This is well illustrated by the following results obtained by the procedure of Example I with acetone at 55° C., in which only the granulation of the raw material was varied.

*Table I*

| Grade of initial di-calcium phosphate (in mesh per inch) | Per cent yield | Per cent of product expressed in granulation of product: Mono-calcium phosphate (in mesh per inch) | | | | | | |
|---|---|---|---|---|---|---|---|---|
| | | 60 | 60–80 | 80–100 | 100–150 | 150–200 | 200–250 | 250 |
| 60–80 | 88.2 | 4 | 80 | 16 | | | | |
| 80–100 | 93.2 | | 13 | 74 | 13 | | | |
| 100–150 | 97.0 | | | 2 | 82 | 16 | | |
| 150–200 | 96.7 | | | | 8 | 84 | 8 | |
| 200–250 | 98.5 | | | | | 30 | 50 | 20 |
| 250 | 100 | | | | | | | |

*Amount of water.*—Water enters into the process at three places. It is a part of the di-calcium phosphate where the dihydrate form is used. It enters into the final product as water of crystallization. It may be a variable component of the liquid medium or phase of which the selected agent and phosphoric acid are the remaining components. The reaction for the preferred process is:

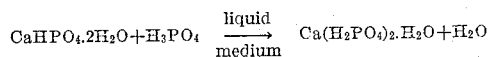

$$CaHPO_4 \cdot 2H_2O + H_3PO_4 \xrightarrow[\text{medium}]{\text{liquid}} Ca(H_2PO_4)_2 \cdot H_2O + H_2O$$

In Example I water is a variable component in the liquid phase apart from the water concerned with the materials and the reaction itself. As the excess of phosphoric acid increases so must the water increase for good yields, but too much water will increase the solubility of the mineral matter, particularly the product, and the clusters of crystals, of which each particle is comprised, are more broken up. For example, in a case like Example I, where 160% excess of phosphoric acid is employed, the variation of water content in the solvent composition affects the yield and the product in the directions indicated in Table II, given on the basis of using commercial 80% phosphoric acid.

*Table II*

| Amount of extra water added | Per cent chemical conversion | Characteristics of mono-calcium phosphate product |
|---|---|---|
| None | 92.5 | Granular. |
| 40 grams | 96.9 | Do. |
| 80 grams | 99.3 | Finer crystals. |

*Phosphoric acid.*—It is to be noted the conversion results in adding water to the liquid phase when the di-calcium phosphate dihydrate is used. The use of excess phosphoric acid for a given amount of modifying agent as in Example I, offsets some of the solvent power of this aqueous phosphoric acid on the product to preserve the desired granular form. Where less than 100% excess phophoric acid is used, the product is broken up into finer crystals because of excess solvent power of the liquid phase. With 100% excess acid, no initial excess of water is required in the liquid medium to secure a nice granular product. As the initial excess of phosphoric acid increases over 100%, the initial excess of water is increased to raise the per cent conversion. The effect of excess acid on yield is illustrated in Table III.

*Table III*

| Initial excess of acid in liquid phase | Per cent chemical conversion | Characteristics of mono-calcium phosphate product |
|---|---|---|
| 0 per cent | 81 | Fine crystals. |
| 50 per cent | 94.4 | Do. |
| 100 per cent | 98.3 | Granular. |

*Modifying agent.*—The quantity of modifying agent may vary over a considerable range. It does not take part in the reaction but acts as a vehicle or diluent, changing the concentrations and solvent powers of the mixed water and acid. Enough should be present at both the beginning and at the end, so that throughout the entire reaction the liquid phase does not dissolve either one of the solid calcium phosphates involved. The content of water and of acid may be varied in proportion and in actual amount, so that it is not possible here to express an exact quantity of modifying agent to be used therewith. One skilled in the art may readily determine how much of any chosen modifying agent is necessary to prevent dissolving the mineral particles.

Where a non-volatile or a high boiling modifying agent is used, as a component of the liquid phase, it may be removed from the product by filtration and washing the liquid material from the mono-calcium phosphate, using in the washing a readily fugitive liquid which is a solvent for the residues of the liquid medium employed. The fugitive washing liquid may be merely evaporated away in the air, by low heat, or by vacuum heating. Likewise, some high-boiling modifying agents as a residue in the filtered or otherwise separated solid product, may be removed by heating the product in a vacuum at temperatures below 100° C.

Although we have mentioned "high-boiling" and "low-boiling" agents herein, and have used 100° C. as a dividing line, it is to be understood that this is not a critical limitation so far as the function of the agent is concerned. It is more related to the product, and the dangers thereto in heating to remove adhering liquid. Because the hydrated product loses water on heating at 100° C., such heating of the product is likely to be avoided, if agents are used which boil below 100° C.

*The product.*—The product has herein been referred to as granular, crystalline, or as particles. When made by the preferred process of using the di-calcium phosphate dihydrate, the product is shown by tests with X-ray patterns and microscopic examinations with polarized light to be distinctive in being a compact cluster or aggregate of crystals united together, rather than a crystalline powder, or an amorphous powder. The preferred manner of carrying out the invention is such as to form and preserve these aggregates or clusters, and by so doing, the resulting particles are predetermined in configuration, or form, and in size by the particles of the di-calcium phosphate dihydrate used as raw material.

We claim:

1. The process of making mono-calcium phosphate mono-hydrate which comprises subjecting di-calcium phosphate dihydrate of the granulation characteristics desired for the resulting mono-calcium phosphate within the range of 60 to 250 mesh, to the converting action of a liquid medium containing essentially an inert liquid diluent and phosphoric acid at least in sufficient quantity to react with said material to form mono-calcium phosphate mono-hydrate, said liquid medium being characterized as it changes throughout the reaction by miscibility with water and by substantial inability to dissolve either form of said calcium phosphate.

2. The process of making mono-calcium phosphate mono-hydrate which comprises subjecting di-calcium phosphate dihydrate of the granulation characteristics desired for the resulting mono-calcium phosphate within the range of 60 to 250 mesh, to the converting action of a liquid medium containing essentially an inert liquid diluent, and phosphoric acid in excess of that quantity to react with said material to form mono-calcium phosphate mono-hydrate, said liquid medium being characterized as it changes throughout the reaction by miscibility with water and by substantial inability to dissolve either form of said calcium phosphate.

3. The process of making mono-calcium phosphate mono-hydrate which comprises subjecting di-calcium phosphate dihydrate of the granulation characteristics desired for the resulting mono-calcium phosphate within the range of 60 to 250 mesh, to the converting action of a liquid medium containing essentially an inert liquid diluent, water and phosphoric acid in excess of that quantity to react with said material to form mono-calcium phosphate mono-hydrate, said liquid medium being characterized as it changes throughout the reaction by miscibility with water and by substantial inability to dissolve either form of said calcium phosphate.

4. The process of making mono-calcium phosphate mono-hydrate having initially desired granulation characteristics which comprises selecting grains of di-calcium phosphate dihydrate having the granulation characteristics desired for the resulting mono-calcium phosphate mono-hydrate within the range 60 to 250 mesh, subjecting the selected grains to the converting action of a homogeneous liquid medium containing essentially an inert liquid diluent and at least sufficient phosphoric acid for the conversion, said liquid medium as it changes throughout the reaction wherein it acquires water being characterized by miscibility with water and by substantial inability to dissolve either di-calcium phosphate dihydrate and mono-calcium phosphate monohydrate.

5. The process of making mono-calcium phosphate mono-hydrate having initially desired granulation characteristics which comprises selecting grains of di-calcium phosphate dihydrate having the granulation characteristics desired for the resulting mono-calcium phosphate monohydrate within the range 60 to 250 mesh, subjecting the selected grains to the converting action of a homogeneous liquid medium containing essentially an inert liquid diluent and an excess of phosphoric acid for the conversion, said liquid medium as it changes throughout the reaction wherein it acquires water being characterized by miscibility with water and by substantial inability to dissolve either di-calcium phosphate dihydrate and mono-calcium phosphate monohydrate.

LOUIS BLOCK.
CHARLES S. KING.